(12) United States Patent
Wiswell

(10) Patent No.: US 10,243,653 B2
(45) Date of Patent: Mar. 26, 2019

(54) SYSTEM AND METHOD FOR HIGH SPEED SATELLITE-BASED FREE-SPACE LASER COMMUNICATIONS USING AUTOMATIC GAIN CONTROL

(71) Applicant: SCHAFER AEROSPACE, INC., Huntsville, AL (US)

(72) Inventor: Eric Wiswell, Sante Fe, NM (US)

(73) Assignee: Schafer Aerospace, Inc., Albuquerque, NM (US)

( * ) Notice: Subject to any disclaimer, the term of this patent is extended or adjusted under 35 U.S.C. 154(b) by 0 days.

(21) Appl. No.: 15/605,549

(22) Filed: May 25, 2017

(65) Prior Publication Data
US 2017/0346564 A1 Nov. 30, 2017

Related U.S. Application Data

(60) Provisional application No. 62/342,454, filed on May 27, 2016.

(51) Int. Cl.
| | | |
|---|---|---|
| H04B 10/61 | (2013.01) | |
| H04J 14/06 | (2006.01) | |
| H04B 10/118 | (2013.01) | |
| H04B 10/294 | (2013.01) | |
| H04B 10/532 | (2013.01) | |
| H04B 10/564 | (2013.01) | |

(52) U.S. Cl.
CPC ....... *H04B 10/118* (2013.01); *H04B 10/2942* (2013.01); *H04B 10/532* (2013.01); *H04B 10/564* (2013.01); *H04B 10/612* (2013.01); *H04B 10/614* (2013.01); *H04J 14/06* (2013.01); *H04J 2203/0076* (2013.01)

(58) Field of Classification Search
None
See application file for complete search history.

(56) References Cited

U.S. PATENT DOCUMENTS

| 5,126,869 A | 6/1992 | Lipchak et al. |
| 5,936,754 A | 8/1999 | Ariyavisitakul et al. |
| 6,348,986 B1 | 2/2002 | Doucet et al. |

(Continued)

OTHER PUBLICATIONS

S. Benedetto, R.Baudino, and P. Poggiolini, "Direct Detection of Optical Digital Transmission Based on Polarization Shift Keying Modulation," IEEE Journal on Selected Areas in Communications, Apr. 1995, vol. 13, No. 3., pp. 531-542.

(Continued)

*Primary Examiner* — Darren E Wolf
(74) *Attorney, Agent, or Firm* — Amster, Rothstein & Ebenstein LLP

(57) ABSTRACT

A high speed satellite-based laser communications system and method for communications between a satellite-based transmitter system and a ground-based receiver over a free space optical link. The satellite-based transmitter system includes an encoder to encode data, a polarization modulator to linearly polarize the encoded data, one or at least two transmitters to transmit the laser beam, and a quarter-wave optical wave plate to circularly polarize the signal to be transmitted. The ground-based receiver includes an automatic gain control to apply AGC to the received data before the polarizations are reversed and the data is decoded. The system enables an increased data throughput and reduces or eliminates the effects of signal fading.

20 Claims, 7 Drawing Sheets

(56) References Cited

U.S. PATENT DOCUMENTS

| | | |
|---|---|---|
| 6,686,879 B2 | 2/2004 | Shattil |
| 6,788,901 B2 | 9/2004 | Sidorovich et al. |
| 6,931,183 B2 | 8/2005 | Panak et al. |
| 7,167,651 B2 | 1/2007 | Shpantzer et al. |
| 7,233,430 B2 | 6/2007 | Caplan |
| 7,620,328 B2 | 11/2009 | Toliver |
| 7,729,616 B2 | 6/2010 | Etemad et al. |
| 7,831,049 B1 | 11/2010 | Kanter |
| 7,920,790 B2 | 4/2011 | Toliver |
| 8,009,192 B2 | 8/2011 | Raskar et al. |
| 8,032,034 B2 | 10/2011 | Yoshino et al. |
| 8,244,137 B1 | 8/2012 | Chen |
| 8,917,995 B1 | 12/2014 | Biffle et al. |
| 2004/0208644 A1 | 10/2004 | Sirat et al. |
| 2005/0158059 A1 | 7/2005 | Vaananen |
| 2007/0242955 A1 | 10/2007 | Mohsen |
| 2008/0279564 A1 | 11/2008 | Han et al. |
| 2009/0110405 A1 | 4/2009 | Lee et al. |
| 2012/0287949 A1 | 11/2012 | Webb |
| 2013/0177322 A1 | 7/2013 | Devaul et al. |
| 2016/0134377 A1 | 5/2016 | Caplan et al. |

OTHER PUBLICATIONS

Pan Ou, Ye Zhang, and Chun-Xi Zhang, "Optical generation of binary-phase-coded, direct-sequence ultra-wideband signals by polarization modulation and FBG-based multi-channel frequency discriminator," Optics Express, Mar. 31, 2008, vol. 16, No. 7, pp. 5130-5135.

Fan Bai, Yuwei Su and Takuro Sato, "Performance Analysis of Polarization Modulated Direct Detection Optical CDMA Systems over Turbulent FSO Links Modeled by the Gamma-Gamma Distribution," Photonics ISSN 2304-6732 Published Jan. 29, 2015; pp. 2, 139-155; www.mdpi.com/journal/photonics.

Bin Cao, Qin-Yu Zhang and Lin Jin, "Polarization division multiple access with polarization modulation for LOS Wireless communications," "EURASIP Journal on Wireless Communications and Networking," Published Aug. 25, 2011; http://jwcn.eurasipjournals.com/content/2011/1/77.

X. Tang, Z. Ghassemlooy, S. Rajbhandari, W.O. Popoola; C.G. Lee; E. Leitgeb and V. Ahmadi; "Free-space optical communication employing polarization shift keying coherent modulation in atmospheric turbulence channel," Conference Paper dated Aug. 2010; http://www.researchgate.net/publication/224176037.

S. Betti, G. De Marchis, E. Iannone and M. Marcelli, "Optical Code Division Multiple Access Techniques based on Polarization Modulated Coherent Systems"; Journal of Optical Communications Oct. 1993, p. 183.

"Polarizer", Wikipedia entry—accessed May 27, 2015; http://en.wikipedia.org/wiki/Polarizer.

Sugianto Trisno and Christopher C. Davis, "Performance of Free-Space Optical Communication Systems Using Polarization Shift Keying Modulation," Free-Space Laser Communications VI, Proc. of SPIE vol. 6304, pp. 63040V-1 to 63040V-9, (2006).

Sugianto Trisno, Igor Smolyaninov, Stuart D. Milner and Christopher C. Davis, "Characterization of Time Delayed Diversity to Mitigate Fading in Atmospheric Turbulence Channels," Free-Space Laser Communications V, Proc. of SPIE vol. 5892, pp. 589215-1 to 589215-10 (SPIE, Bellingham, WA, 2005).

Sugianto Trisno, Igor Smolyaninov, Stuart D. Milner and Christopher C. Davis, "Delayed Diversity for Fade Resistance in Optical Wireless Communications Through Turbulent Media," Optical Transmission Systems and Equipment for WDM Networking III, Proceedings of SPIE vol. 5596, pp. 385-394 (SPIE, Bellingham, WA, 2004).

"Hadamard Code," Wikipedia, https://en.wikipedia.org/wiki/Hadamard_code. Accessed Jul. 15, 2015.

International Search Report for PCT/US2017/034523, dated Aug. 7, 2017.

Written Opinion for PCT/US2017/034523, dated Aug. 7, 2017.

SYSTEM AND METHOD FOR HIGH SPEED SATELLITE-BASED FREE-SPACE LASER COMMUNICATIONS USING AUTOMATIC GAIN CONTROL

CROSS-REFERENCE TO RELATED APPLICATION

The present application claims priority to and the benefit of U.S. Provisional Patent Application No. 62/342,454, filed on May 27, 2016, the entire contents of which are incorporated by reference as if fully set forth herein.

FIELD

The present invention is generally related to an improved system and method for transmitting optical signals from a satellite to a ground-based receiver. In particular, the present invention relates to high speed free-space laser communications between a satellite-based transmitter and a ground-based receiver that uses automatic gain control to increase data throughput and reduce or eliminate the effects of signal fading.

BACKGROUND

Polarization shift keying (PolSK) modulation encodes data onto an optical beam by altering the polarization state of the beam through adjustment of optical phase between two polarization states. This encoding allows the transmission of data through a free-space optical ("FSO") link using existing high-speed phase modulators. A free-space optical link is a link that uses light propagating in free space, such as air, outer space or a vacuum, to wirelessly transmit data for telecommunications or computer networking. The optical transmission of a signal over a free space optical link presents challenges as the optical signal is subject to atmospheric turbulence, that causes the optical signal to fade.

A recent paper by Bai, et al. in *Performance Analysis of Polarization Modulated Direct Detection Optical CDMA Systems over Turbulent FSO Links Modeled by the Gamma-Gamma Distribution*, Photonics 2015, 2, 139-155, ISSN 2304-6732, describes optical transmissions between a ground-based transmitter and receiver over an FSO link when using polarization shift keying (PolSK) to modulate the optical signal along with optical code division multiple access (CDMA) encoding of the optical signal to be transmitted over the FSO link. The prior art system of Bai, el al., shown in FIG. 1, illustrates both a transmitter 10 to process and transmit data 11 as an optical signal over an FSO and a receiver 20 to receive and process the data. Transmitter 10 illustrated in Bai, et al. includes a polarization controller 14 that linearly polarizes an input laser beam 18 at a 45° angle and feeds the polarized laser beam to a modulator 16. Modulator 16 includes a polarization beam splitter (PBS) 16a, an optical phase modulator 16b for modulating CDMA-encoded data onto the laser beam, and a polarization beam combiner 16c that combines the phase modulated CDMA-encoded data and the unmodulated portion of the laser beam for transmission as an optical signal over the FSO link 19. Transmitter 10 in Bai, et al. further includes a CDMA encoder 13 to encode both data 11 and a modified prime code (MPC) sequence for a particular user which is then fed to modulator 16. Thus, the transmitted signal is both CDMA-encoded and polarization modulated.

Receiver 20 in Bai, et al. reverses the polarization modulation and the CDMA encoding. Receiver therefore includes polarization controller 21 to receive the optical signal, a second polarization beam splitter (PBS) 22 splits the signal based on the polarization state of each portion of the signal and reconstructs the data that was transmitted by applying polarizers 23, 24, optical correlators 25, 26, and photodetectors 27, 28 to the split polarized signal, then adding and amplifying the signal at respective adder 28 and amplifier 29, filtering the signal at low-pass filter (LPF) 30 and a decision processor 31 for determining signal reconstruction of the signal output from LPF 30.

The system described in Bai, et al. suffers from problems of signal fading over FSO links for high-speed laser communications from a satellite-based transmitter to a ground-based receiver where it is desired to transmit signals at very high speeds such as at 10 Gbits/sec. A signal transmitted by a satellite-based laser communications system must necessarily pass over a long FSO link and therefore encounters a great deal of fading. An improved solution is therefore needed for satellite to ground laser communications to provide for faster, more reliable, and higher-quality laser communications that account for fading caused by atmospheric conditions.

Satellite-based laser communications systems generally require complex electronics and electro-optical sub-systems to provide a robust system that can deal with atmospheric conditions. These electronics and electro-optical sub-systems tend to undesirably occupy a significant amount of space, which, in turn, requires larger satellites. It is therefore desirable to develop electronics and electro-optical sub-systems that are lighter, cheaper and more compact.

SUMMARY

A satellite-based laser communications system in accordance with the present invention is therefore provided with a receiver that includes an automatic gain control to process the received polarization modulated signal before demodulating the received signal and thereby reduce or eliminate the effects of channel fading.

In accordance with an embodiment of the present invention, a ground-based receiver for receiving a signal transmitted by a satellite-based transmitter subsystem of a satellite-based laser communications system for communication between a satellite and the ground-based receiver using a laser beam over a free-space optical link that uses light propagating in free space for wireless data communications, includes (a) an optical automatic gain control circuit that processes the received signal that was transmitted by the satellite-based transmitter subsystem using the laser beam to account for signal fading and atmospheric conditions over the free-space optical link. The optical automatic gain control circuit has a channel state estimator that receives a fraction of the received signal, estimates a state of the communication channel parameters that may have degraded the received signal, and outputs a control signal comprising the estimated communication channel parameters, and an optical amplifier to receive the control signal that is output by the channel state estimator and to adjust and amplify the received signal based, at least in part, on the control signal to output an automatic gain controlled signal that has two circularly polarized states.

The ground-based receiver in this embodiment of the present invention further includes (b) a quarter-wave ($\lambda/4$) optical wave plate to convert the automatic gain controlled signal from two circularly polarized states into an optical beam having two linear polarization states, including a first linear polarization state and a second linear polarization state; (c) a polarizing beam splitter to split the optical beam into a first linearly polarized beam corresponding to the first linear polarization state and a second linearly polarized beam corresponding to the second linear polarization state; (d) two detectors, including a first detector to detect the first linearly polarized beam and a second detector to detect the second linearly polarized beam; (e) image processing circuitry or a computer-implemented image processing module comprising an algorithm to generate a difference in the output of the two detectors to develop an output signal that comprises the signal as encoded at the satellite-based transmitter; (f) a decoder to decode the output signal to obtain the transmitted data; and (g) an output module to output the transmitted data, wherein the optical automatic gain control circuit at least partially compensates for fading effects that occur during satellite transmissions to enable improvement in data throughput. A ground-based receiver of the present invention enables the received signal to be transmitted by the satellite-based transmitter subsystem to the ground-based receiver at a data rate at least as high as 10 Gbps.

In embodiments, the decoder at the ground-based receiver is configured to perform error correction on the output signal when the received signal was error correction encoded at the satellite-based transmitter subsystem. Also, in embodiments, the decoder at the ground-based receiver includes a deinterleaver to deinterleave the encoded output signal when the received signal was interleaved at the satellite-based transmitter subsystem. Further, in embodiments, the decoder at the ground-based receiver includes a demultiplexer to obtain multiple channels of data from the output signal when the multiple channels of data were multiplexed at the satellite-based transmitter subsystem.

In embodiments, the optical amplifier comprises one or more optical fiber amplifiers. Further, in embodiments, the first detector is configured to detect a first area on an imaging sensor focal plane and the second detector is configured to detect a second area on the imaging sensor focal plane. Also, in embodiments, the ground-based receiver may be configured to be used in conjunction with an on-off keying signaling system or a differential phase shift keying (DISK) system.

In accordance with another embodiment of the present invention, a satellite-based laser communications system for communication between a satellite and a ground-based receiver comprises a satellite-based transmitter subsystem to transmit a signal to a ground-based receiver over a free-space optical link, wherein the free space optical link uses light propagating in free space, such as air, outer space or a vacuum, to wirelessly transmit data for telecommunications or computer networking, and the ground-based receiver. The satellite-based transmitter subsystem includes (a) an input module for receiving data to be transmitted to the ground-based receiver, (b) an encoder to encode the data to be transmitted, (c) a processor configured to generate a transmission signal comprising the encoded data, (d) a laser light source to generate a linearly polarized laser beam, (e) at least one polarization modulator that further encodes the encoded data in the transmission signal onto the laser beam by polarization modulation of the laser beam through adjustment of an optical phase between two linear polarization states using one or more high-speed phase modulators each comprising an electro-optical crystal aligned with its active axis at 45° to the linearly polarized input beam, (f) at least one transmitter for transmitting the polarization modulated laser beam, wherein, the amount of energy in each of the two linear polarization states is dependent on the applied voltage, and (g) a quarter-wave ($\lambda/4$) optical wave plate to convert the two linear polarization states of the polarization modulated laser beam into circularly polarized states in which to transmit the laser beam via the free-space optical link so that the ground-based receiver need not be aligned in rotation with respect to the transmitter.

In embodiments, the ground-based receiver of the satellite-based laser communications system includes (a) an optical automatic gain control circuit that processes the received signal to account for signal fading and atmospheric conditions over the free-space optical link. The optical automatic gain control circuit has a channel state estimator that receives a fraction of the received signal and estimates a state of communication channel parameters that may have degraded the received signal, and outputs a control signal comprising estimated communication channel parameters to the optical amplifier, and has an optical amplifier to receive the control signal that is output from the channel state estimator and to adjust and amplify the received signal based, at least in part, on the control signal to output an automatic gain controlled signal that has two circularly polarized states. The ground-based receiver further includes (b) a quarter-wave ($\lambda/4$) optical wave plate to convert the automatic gain controlled signal from the two circularly polarized states into an optical beam having two linear polarization states, including a first linear polarization state and a second linear polarization state, (c) a polarizing beam splitter to split the optical beam into a first linearly polarized beam corresponding to the first linear polarization state and a second linearly polarized beam corresponding to the second linear polarization state, (d) two detectors, including a first detector to detect the first linearly polarized beam and a second detector to detect the second linearly polarized beam, (e) image processing circuitry or a computer-implemented image processing module comprising an algorithm to generate the difference in the output of the two detectors to develop an output signal that comprises the signal as encoded at the satellite-based transmitter subsystem, (f) a decoder to decode the output signal to obtain the transmitted data; and (g) an output module to output the transmitted data. The optical automatic gain control circuit at least partially compensates for fading effects that occur during satellite transmissions to enable improvement in data throughput. Thus, the signal is not overcome by interference like atmospheric scintillation when transmitted at high speeds from the satellite-based transmitter subsystem to the ground-based receiver.

In accordance with an alternative exemplary embodiment of the present invention, a satellite-based laser communications system for communication between a satellite and a ground-based receiver comprises a satellite-based transmitter subsystem to transmit a signal to a ground-based receiver over a free-space optical link, wherein the free space optical link uses light propagating in free space, such as air, outer space, or a vacuum, to wirelessly transmit data for telecommunications or computer networking, and the ground-based receiver. The satellite-based transmitter subsystem includes (a) an input module for receiving data to be transmitted to the ground-based receiver, (b) an encoder to encode the data to be transmitted, (c) a processor configured to generate a transmission signal comprising the encoded data, (d) a laser light source to generate a linearly polarized laser beam, (e) a polarization modulator that further encodes the encoded data in the transmission signal onto the laser beam by altering the polarization state of the laser beam through adjustment of an optical phase between two linear polarization states using one or more high-speed phase modulators each comprising an electro-optical crystal aligned with its active axis at 45° to the linearly polarized input beam; wherein the amount of energy in each of the two linear polarization states is dependent on the applied voltage, (f) at least two transmitters, wherein each of the two transmitters transmits a portion of the polarization modulated laser beam that corresponds to a respective one of the two linear polarization states, and (g) a quarter-wave ($\lambda/4$) optical wave plate to convert the two linear polarization states into circularly polarized states in which to transmit the polarization modulated laser beam via the free-space optical link so that the ground-based receiver need not be aligned in rotation with respect to the transmitter.

In accordance with this alternative exemplary embodiment, the ground-based receiver comprises (h) an optical automatic gain control circuit that processes the received signal to account for signal fading and atmospheric conditions over the free-space optical link, the optical automatic gain control circuit comprising a channel state estimator that receives a fraction of the received signal and estimates a state of communication channel parameters that may have degraded the received signal, and outputs a control signal comprising estimated communication channel parameters to the optical amplifier, and an optical amplifier to receive the control signal that is output from the channel state estimator and to adjust and amplify the received signal based, at least in part, on the control signal to output an automatic gain controlled signal that has two circularly polarized states. The ground-based receiver further comprises (i) a quarter-wave ($\lambda/4$) optical wave plate to convert the automatic gain controlled signal with the circularly polarized states transmitted with the received laser beam back into an optical beam having two linear polarization states, (j) a polarizing beam splitter to split the optical beam into two beams, one for each of the two linear polarization states, (k) two detectors, one for each of the two beams, to capture the linear polarization state for the beam to be detected, (l) circuitry or an image processing module comprising an algorithm to generate the difference in the output of the two detectors or focal plane areas to develop an output signal that comprises the signal as encoded at the satellite-based transmitter subsystem, (m) a decoder to decode the output signal to obtain the transmitted data, and (n) an output module to output the transmitted data.

In the alternative embodiment of the satellite-based laser communications system, the satellite-based transmitter subsystem may comprise at least two transmitters that use a time division diversity scheme to transmit the laser beam to the ground-based receiver to account for possible different arrival times at the ground-based receiver for different channels.

In embodiments of the satellite-based laser communications system, the polarization modulation boosts signal strength and is not overcome by interference like atmospheric scintillation and the automatic gain control increases data throughput and eliminates the effects of fading that occur during satellite transmissions.

In embodiments, the encoder may be a code division multiple access (CDMA) encoder that is configured to (1) encode a synchronization channel using asynchronous CDMA encoding with pseudo-random modulation, and (2) separately encode the data to be transmitted as data symbols using CDMA encoding with modified Walsh matrix modulation to distribute the encoded data symbols across multiple channels so as to maximize a data transfer rate; wherein, the modified Walsh matrix modulation values are derived from the pseudo-random modulation vector and Walsh vector within each data symbol by successively projecting each Walsh vector out of the sub-space spanned by the pseudo-random modulation vector and any previous modified Walsh vectors, and then normalizing. Further, in embodiments, the decoder at the ground-based receiver comprises a CDMA decoder to decode the received multiple channels of the CDMA-encoded signal using the synchronization signal to obtain the transmitted data. Use of CDMA encoding may further increase data throughput and reduce fading effects on the CDMA-encoded signal that results from the satellite transmissions over the free space optical link.

In embodiments, the satellite-based transmitter subsystem includes an error correction encoder to encode the CDMA-encoded data with error correction codes, and the ground-based receiver includes an error correction decoder to decode the error correction coding for the CDMA-encoded data. Also, in embodiments, the satellite-based transmitter subsystem further includes an interleaver to interleave the CDMA-encoded data, and the ground-based receiver further includes a deinterleaver to restore the CDMA-encoded data.

A relative intensity between the two linear polarization states may be used by the encoder to encode the data to be transmitted into an analog or digital format. Moreover, in embodiments, a ratio of energy between the two linear polarization states is not affected by atmospheric scintillation, and can thus be used to send more than one bit of digital information, or analog information, independent of atmospheric scintillation or link transmission properties.

In embodiments, the optical amplifier of the ground-based receiver may comprise one or more optical fiber amplifiers. Also, in embodiments, a first detector of the two detectors is configured to detect a first area on an imaging sensor focal plane and a second detector of the two detectors is configured to detect a second area on the imaging sensor focal plane.

Moreover, in embodiments, the ground-based receiver may also be used in conjunction with OOK signaling systems (on-off keying or OOK) or in conjunction with Differential phase shift keying (DPSK) systems.

The present invention further includes a method of performing automatic gain control on a polarization modulated signal at the input to a ground-based receiver in accordance with any of the embodiments of the present invention.

In accordance with embodiments of the present invention, a method of processing a signal received at a ground-based receiver from a satellite-based transmitter subsystem of a satellite-based laser communications system, includes (a) receiving, by the ground-based receiver, the signal that has been transmitted using a laser beam over a free-space optical link using light propagating in free space for wireless data communications, wherein the transmitted signal was polarization modulated onto the laser beam by altering the polarization state of the laser beam through adjustment of an optical phase between two linear polarization states, including a first linear polarization state and a second linear polarization state, using one or more high-speed phase modulators each comprising an electro-optical crystal aligned with its active axis at 45° to the linearly polarized input beam, and wherein the two linear polarization states of the polarization modulated laser beam were converted into two circularly polarized states for transmission using a quarter-wave ($\lambda/4$) optical wave plate. The method further includes: (b) performing, by an optical automatic gain control circuit, automatic gain control on the received signal at an input to the ground-based receiver to account for signal fading and atmospheric conditions over the free-space optical link, the performance of optical automatic gain control comprising (1) estimating, using a channel state estimator, a state of communication channel parameters that may have degraded the received signal and outputting a control signal comprising estimated communication channel parameters to an optical amplifier; and (2) adjusting and amplifying, using the optical amplifier, the received signal based, at least in part, on the control signal output to output an automatic gain controlled signal that has the two circularly polarized states. The method further includes (c) converting the automatic gain controlled signal from the two circularly polarized states into an optical beam having two linear polarization states using a quarter-wave (λ/4) optical wave plate, (d) splitting, with a polarizing beam splitter, the optical beam into a first linearly polarized beam corresponding to the first linear polarization state and a second linearly polarized beam corresponding to the second linear polarization state, (e) detecting the first linearly polarized beam using a first detector and detecting the second linearly polarized beam using a second detector, (f) generating, using image processing circuitry or a computer-implemented image processing module, a difference in the output of the two detectors to develop an output signal that comprises the signal as encoded at the satellite-based transmitter, (g) decoding, using a decoder, the output signal to obtain the transmitted data, and (h) outputting the decoded data. The method at least partially compensates for fading effects that occur during satellite transmissions to enable improvement in data throughput.

In embodiments, the detection of the first linear polarization state and the second polarization state of the two optical beams comprises detecting a first area on an imaging sensor focal plane using the first detector and detecting a second area on the imaging sensor focal plane using the second detector.

In embodiments, the method further comprises performing error correction on the output signal where the transmitted signal was error correction encoded. Also, in embodiments, the method comprises performing deinterleaving on the output signal when the transmitted signal was interleaved.

BRIEF DESCRIPTION OF THE DRAWINGS

Exemplary embodiments of the present invention will be described with references to the accompanying figures, wherein.

DETAILED DESCRIPTION

The present invention is generally related to an improved system and method for transmitting optical signals from a satellite to a ground-based receiver. In particular, the present invention relates to high speed free-space laser communications between a satellite-based transmitter and a ground-based receiver that uses automatic gain control to increase data throughput and reduce or eliminate the effects of signal fading.

A system and method in accordance with the present invention provides a high-speed free-space laser communications that at the transmitter polarization modulates an optical signal to be transmitted over an FSO link into two orthogonal quarter-wave circularly polarized states and at the receiver applies an automatic gain control to the optical signal that has been received at the receiver while the received optical signal is circularly polarized and before the signal is polarization demodulated.

Figure 1:
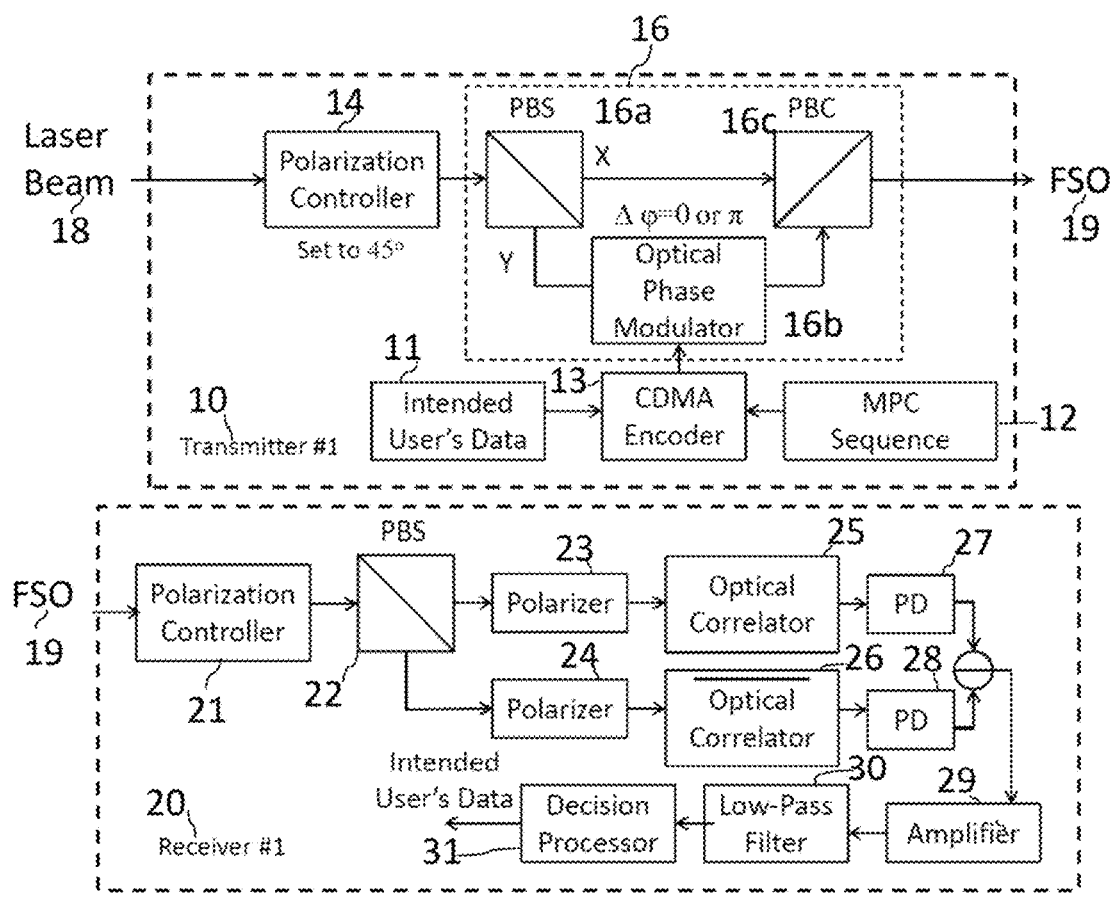
FIG. 1 is a diagram illustrating a prior art free-space laser communications system for transmission of an optical signal that has been polarization modulated and CDMA-encoded over an FSO link.
Figure 2:
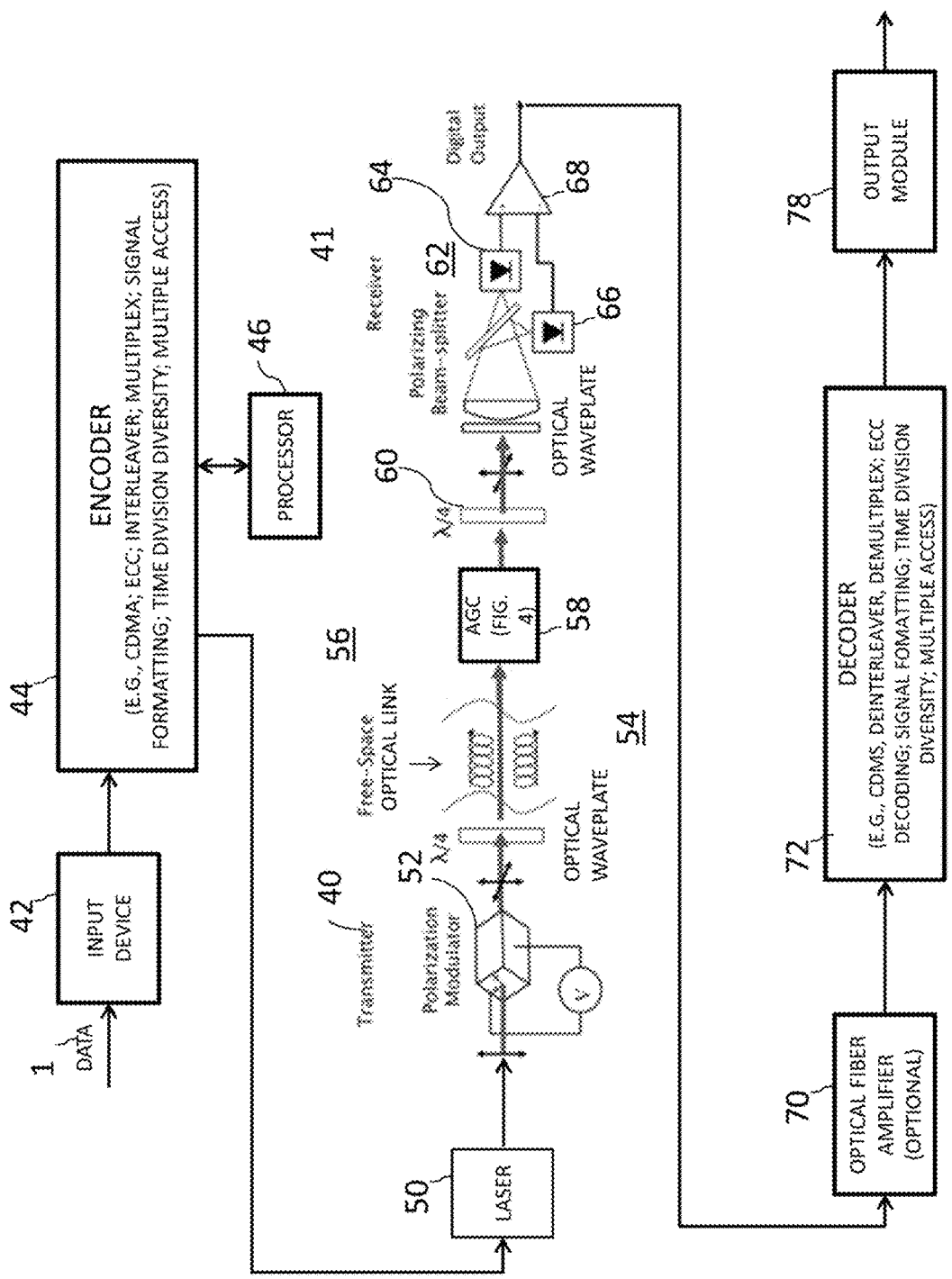
FIG. 2 is a diagram illustrating a high-speed free-space laser communications system for satellite-to-ground communications in accordance with an embodiment of the present invention.

FIG. 2 is a diagram of the satellite-based laser communications system 1 of the present invention that comprises a satellite-based PolSK transmitter 40 in a transmitter subsystem (input device 42 to wave plate 54) to transmit data over an FSO link and a ground-based receiver 41 that is configured to receive and process the transmitted data. In communications system 1, data is input via an input device/input module 42 at transmitter 40. The input device/input module 42 collects input data from data sources and formats the collected data, as necessary, for input to the transmitter subsystem. The input data is then encoded at encoder 44 by an encoding scheme, such as, for example, an optical CDMA encoding scheme. Encoder 44 may have optional circuitry to perform one or more operations on the data to format the data and improve its robustness. For example, encoder 44 may include an optional ECC encoder to add error correction codes to the encoded data to allow for error correction to be performed at receiver 41, and may be optionally interleaved at an interleaver to enhance the ability to perform error correction, especially when there are burst errors. Encoder 44 may also reformat the data, multiplex multiple channels of data, perform time division diversity, and allow for multiple accesses. A processor 46 coupled to encoder 44 is configured to generate a transmission signal comprising the encoded data.

The encoded data output from encoder 44 is then modulated onto a linearly polarized laser beam that is generated by a laser light source 50. A polarization modulator 52, which may be included in transmitter 40, alters the polarization state of a portion of the laser beam through adjustment of an optical phase between two orthogonal linear polarization states, where the amount of energy in each of the two linear polarization states is dependent on the applied voltage. The voltage that is applied for each of the two linear polarization states may be varied such that the relative intensity between the two linear polarization states can also be used to encode additional information into the signal using another analog or digital format. The polarization of the laser beam into the two linear polarization states is performed by an electro-optical crystal that is aligned with its active axis at 45° to output the linearly polarized input beam.

After the laser beam is linearly polarized into two states, the laser beam is transmitted by transmitter 40 through a quarter-wave (λ/4) optical wave plate 54 to convert the two linear polarization states into circularly polarized states and the laser beam is then transmitted via the free-space optical link 19 to the ground-based receiver 41. By transforming the linearly polarized states into circularly polarized states, the receiver 41 need not be aligned in rotation with respect to the transmitter 40 to receive the transmitted optical signal.

The polarization modulation receiver can be used in conjunction with OOK (on-off keying) signaling systems to convey additional information or in conjunction with DPSK (differential phase shift keying) systems to modulate additional information onto the transmitted optical signal.

Figure 4:
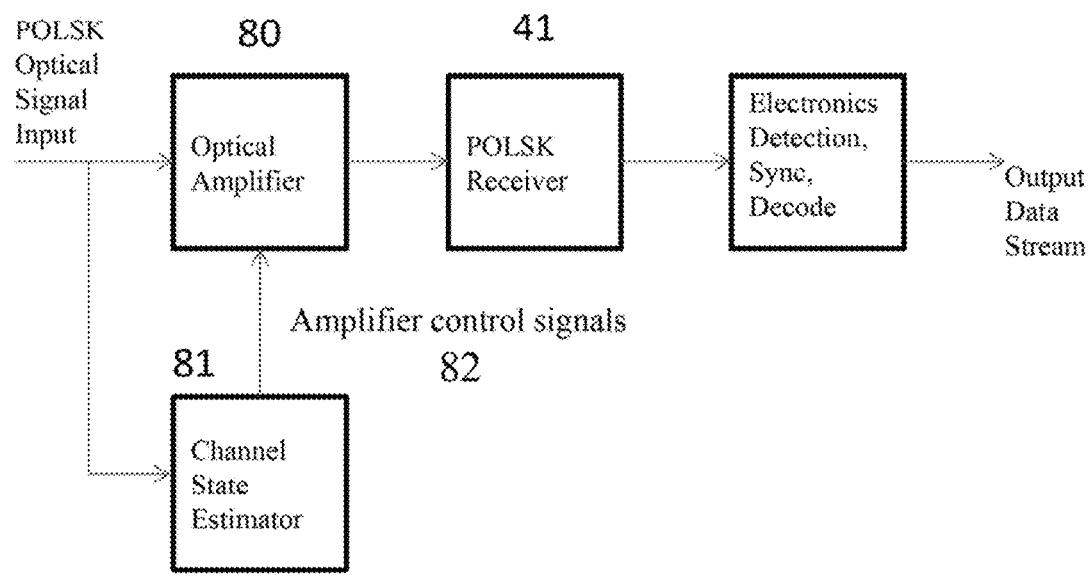
FIG. 4 is a block diagram of an automatic gain control circuit in accordance with an embodiment of the present invention for use in a high-speed free-space laser communications.

Receiver 41 receives the optical signal in the form of a laser beam transmitted over FSO link 56 and subjects the signal to an optical automatic gain control (AGC) circuit 58. FIG. 4 shows an implementation of the AGC circuit 58. In FIG. 4, the optical automatic gain control circuit 58 processes the received signal to account for signal fading and atmospheric conditions over the free-space optical link 56. The optical automatic gain control circuit 58 includes an optical amplifier 80, such as one or more optical fiber amplifiers, to adjust and amplify the received signal in the laser beam to output an automatic gain controlled signal, and a channel state estimator 81. Channel state estimator 81 captures a fraction of the incoming channel and uses it to estimate the communication channel parameters, particularly the fade state of the channel, that degraded the received signal as it passed through the free-space optical link 56. Control signals 82, comprising the estimated communication channel parameters, are sent to the optical amplifier 80 where they are used to adjust and amplify the signal output from automatic gain control 58.

Significantly, the optical automatic gain control circuit 58 limits the bandwidth range of the received laser beam signal to be closer to the bandwidth of the signal that was actually transmitted so that detectors 64, 66 at receiver 41 can process a signal having a more limited bandwidth. For the AGC circuit 58 to work effectively, the fade rate must be slower than the data rate, as is the case in high-speed satellite communications where fast data rates, such as data rates at least as high as 10 Gb/sec (Gbps), are desired.

After performing automatic gain control, the signal is transmitted through a quarter-wave (λ/4) optical wave plate 60 to transform the signal from a circularly polarized state back to a linearly polarized signal. Next, a polarizing beam splitter 62 splits the beam into two beams, one for each of the two linear polarization states. Each of the beams is input to a respective detector 64, 66, to recapture the entire signal and the outputs are fed to an image processing circuit that includes circuitry, such as comparator 68, or a computer-implemented image processing module (not shown) using an image processing algorithm, to generate the difference in the output of the two detectors 64, 66, that detect separate areas on an imaging focal plane, to develop an output signal that comprises the encoded signal as encoded at the satellite-based transmitter subsystem.

The output of the comparator 68 may then be optically amplified, such as optical fiber amplifier 70, and may then be decoded at decoder 76. Decoder 76 performs operations that are the inverse to the operations that were performed at encoder 44. For example, if CDMA encoding was used at the encoder 44, then signal must be CDMA decoded at decoder 76. If interleaving was performed at encoder 44, decoder 76 must perform deinterleaving and an ECC encoded signal must be ECC decoded. The transmitted data is output via an output module 78 where the data may be reformatted as necessary for transmission to users via a network, such as a telecommunications network or the Internet.

As noted above, in embodiments, encoder 44 may perform optical CDMA encoding. The optical CDMA coding may be performed for example, by encoding a synchronization channel using asynchronous CDMA encoding with pseudo-random modulation, and separately encoding the data to be transmitted as data symbols using CDMA encoding with modified Walsh matrix modulation to distribute the encoded data symbols across multiple channels so as to maximize a data transfer rate. The modified Walsh matrix modulation values are derived from the pseudo-random modulation vector and Walsh vector within each data symbol by successively projecting each Walsh vector out of the sub-space spanned by the pseudo-random modulation vector and any previous modified Walsh vectors, and then normalizing the result. The multiple channels and the separate synchronization channel may be multiplexed into the transmission signal by direct addition of each channel's signal value, and the transmission signal may be normalized by scaling the multiplexed signal values to the full modulation range within each pseudo-random period.

For CDMA decoding, the received multiple channels of the CDMA-encoded signal uses the synchronization signal to obtain the transmitted data. Using CDMA encoding and decoding as well as the error correction processing and interleaving, further reduces interference and fading in the satellite transmission and increases data throughput. However, the CDMA transmitted signal nevertheless may still be subject to fading during transmission that is not compensated for by the CDMA encoding or other encoding steps. Thus, the automatic gain control circuit 58 at the input to the receiver 41 beneficially compensates for the fading effects of satellite transmissions, increases the data throughput via the FSO link 56 and boosts throughput. As the ratio of energy between the two polarization states in a satellite-based laser communications system of the present invention is not affected by atmospheric scintillation, the ratio of energy can also be used to send more than one bit of digital information, or analog information, independent of atmospheric scintillation or link transmission properties.

Figure 3:
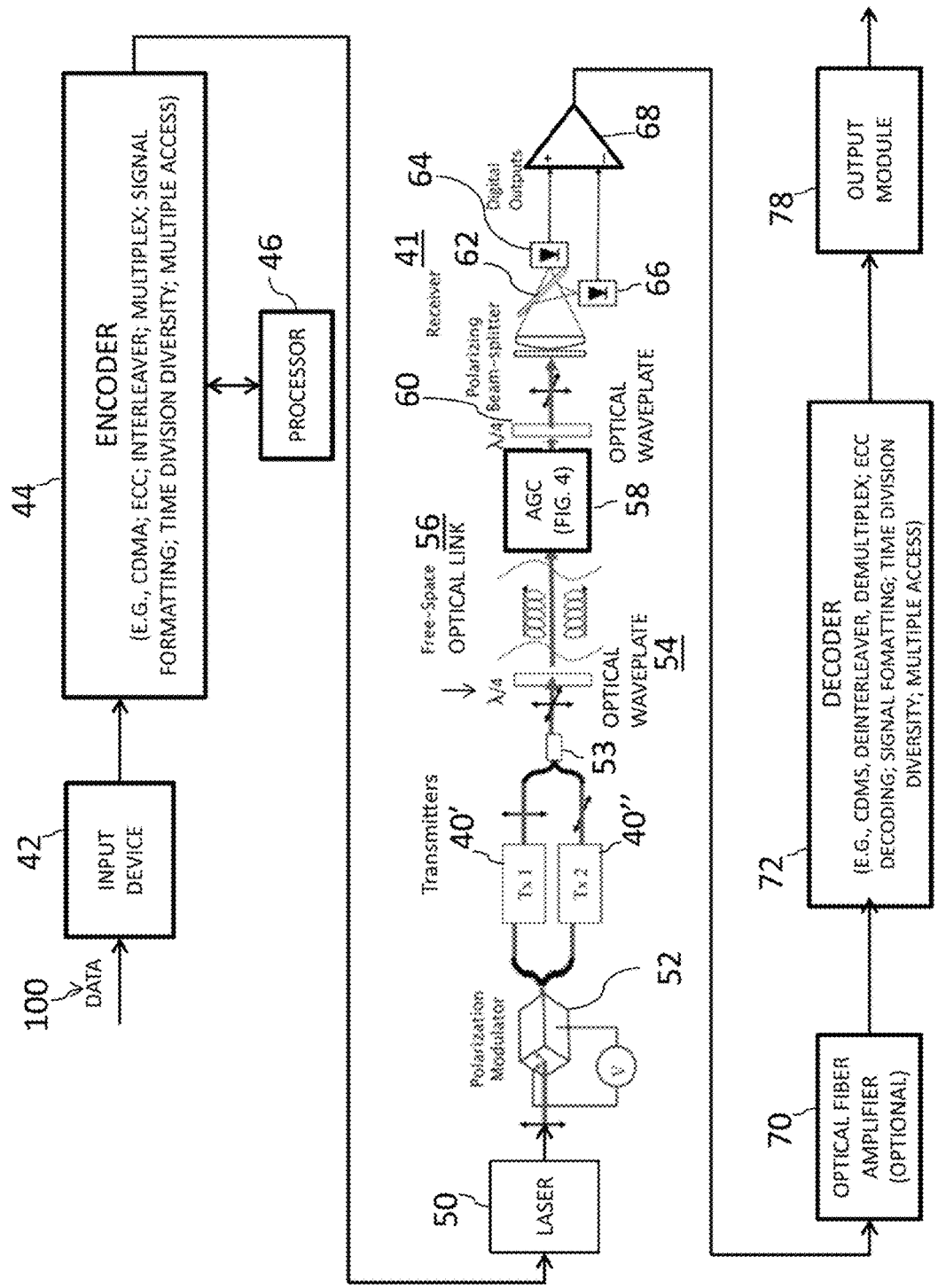
FIG. 3 is a diagram illustrating a high-speed free-space laser communications system for satellite-to-ground communications in accordance with a second embodiment of the present invention.

FIG. 3 shows an alternative embodiment of a satellite-based laser communications system 100 that includes two transmitters 40' and 40", rather than just one transmitter 40, with polarization modulator 52 preceding transmitters 40' and 40" and a multiplexer 53 between laser 50 and optical wave plate 54. The other elements of system 100 are similar to the elements of system 1 shown in FIG. 2 and are identified by similar reference numerals. In the embodiment of FIG. 3, polarization modulator 52 may have two phase modulators, which polarizes the laser beam into one of the two orthogonal linear polarization states using an electro-optical crystal that is aligned with its active axis at 45° to the input linearly polarized input beam. The output of each phase modulator is input to one of two transmitters 40' and 40". The signals from the two phase modulators are then multiplexed at multiplexer 52 and input to quarter-wave (λ/4) optical wave plate 54 to convert the two linear polarization states into circularly polarized states. The circularly polarized laser beam is then transmitted via the free-space optical link 19 from transmitters 40' and 40" to the ground-based receiver 41. The use of two transmitters increases the transmission speed and throughput of the optical signal through satellite-based laser communications system 100 to ground-based receiver 41.

Figure 5:
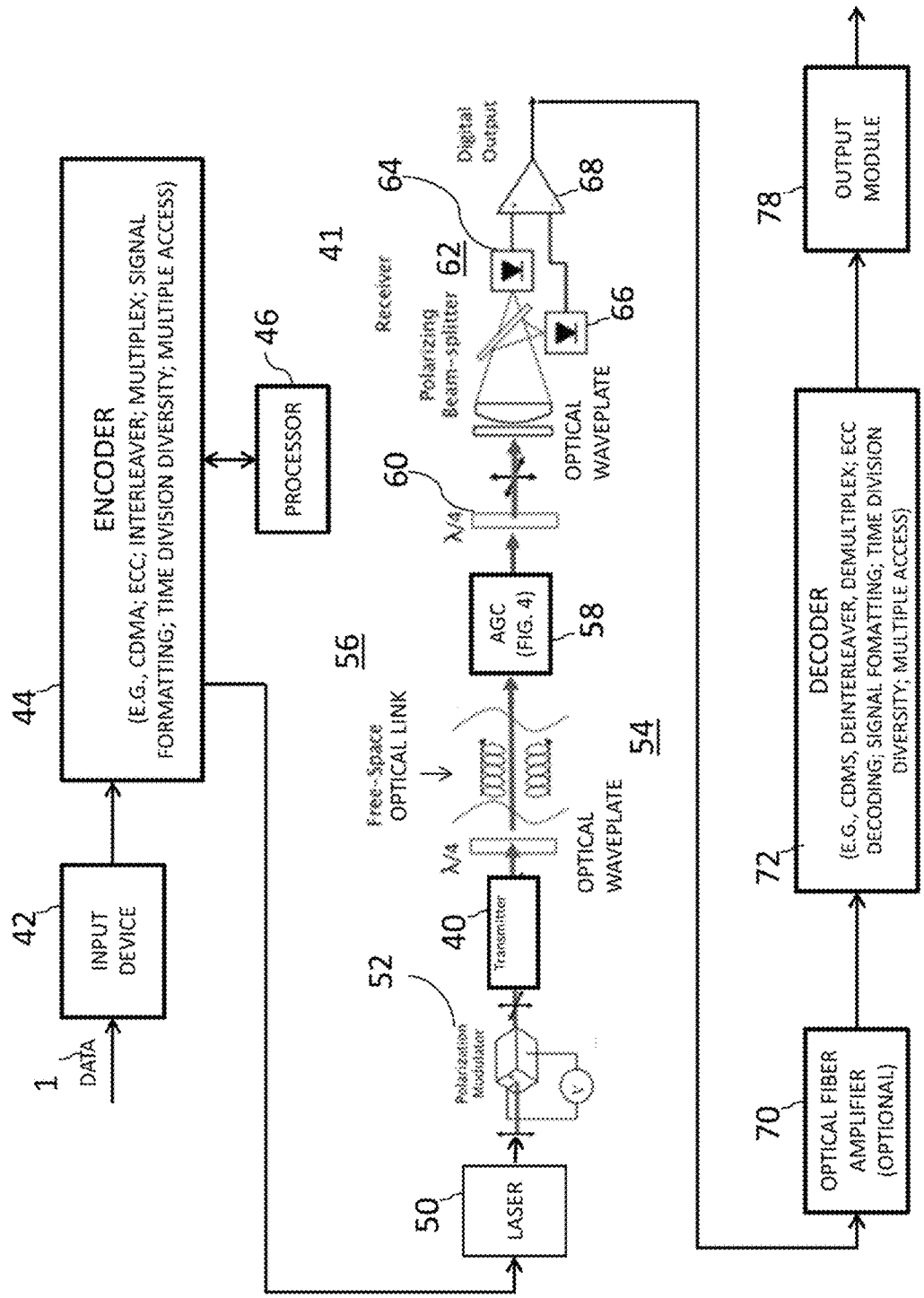
FIG. 5 is a diagram illustrating a variation of the first embodiment of the high-speed free-space laser communication system shown in FIG. 2.

FIG. 5 is a diagram illustrating a variation of the first embodiment of the high-speed free-space laser communication shown in FIG. 2. In FIG. 5, polarization modulator 52 precedes transmitter 40, but the elements shown in FIG. 5 are otherwise identical to FIG. 2.

Figure 6:
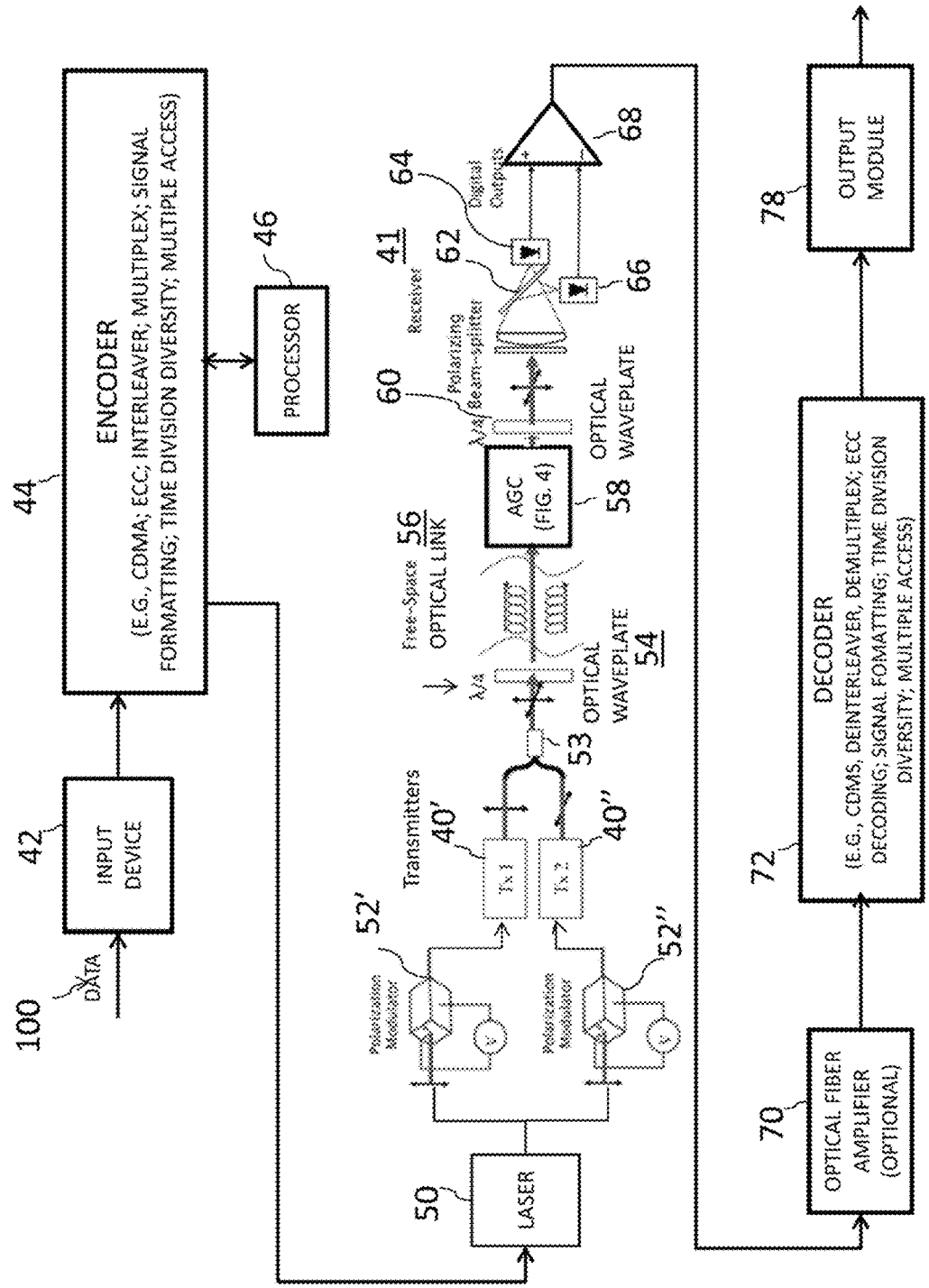
FIG. 6 is a diagram illustrating a variation of the second embodiment of the high-speed free-space laser communication system shown in FIG. 3.

FIG. 6 is a diagram illustrating a variation of the first embodiment of the high-speed free-space laser communication shown in FIG. 3. In FIG. 6, separate polarization modulators 52', 52" are used to feed respective transmitters 40', 40", but the figure is otherwise identical to FIG. 3.

The use of an AGC circuit at the input to a receiver to address the fading of signals transmitted by satellite obviates the need for alternative circuitry/processing at the satellite-based transmitter for more intensive encoding and error correction. As a result, the transmitter design may be simplified and made more compact, allowing the size of the satellite can be reduced so that it is lighter, cheaper and more compact. Moreover, space may be freed up in the satellite for other equipment that provides additional functionality.

Figure 7:
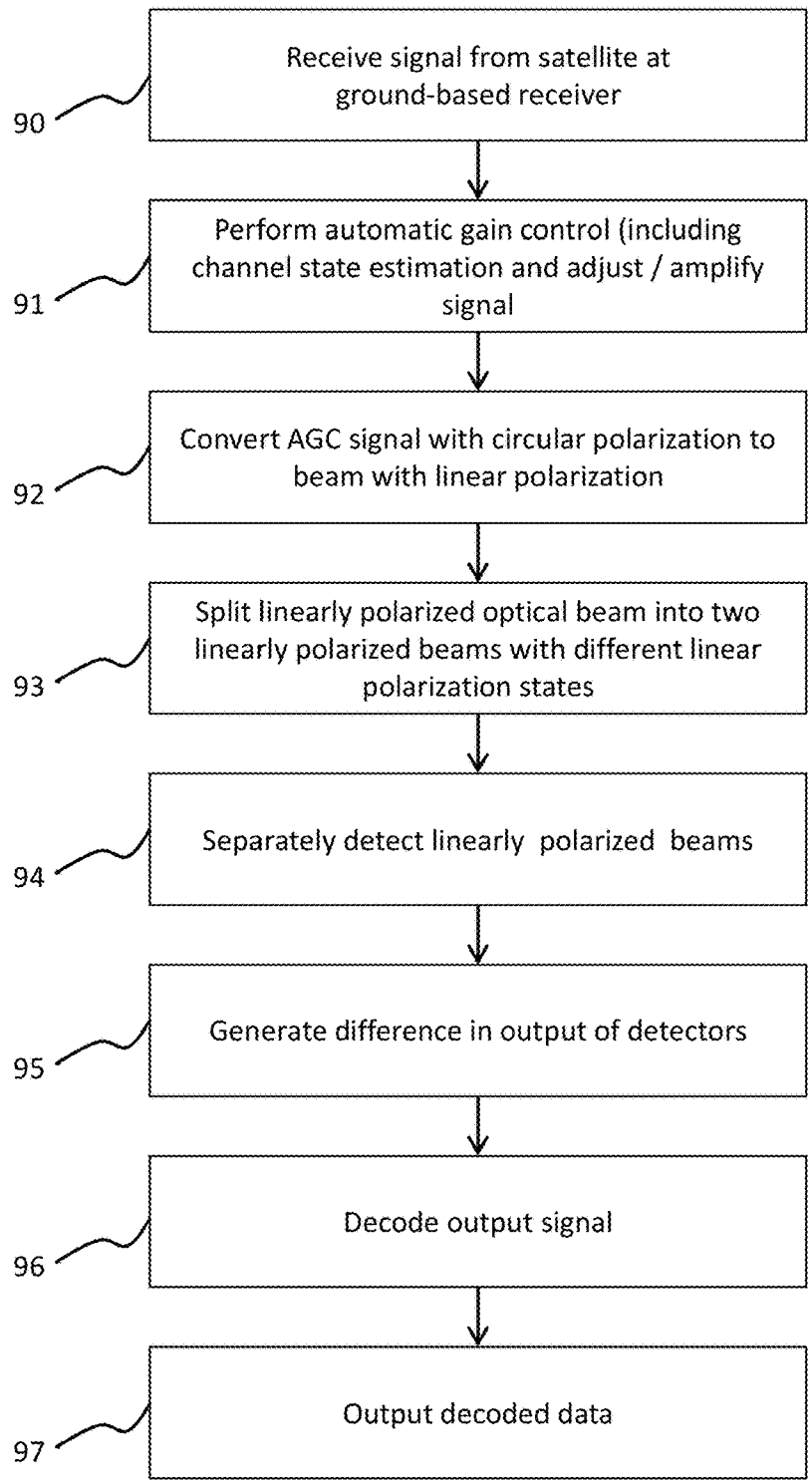
FIG. 7 is a flow chart illustrating a method of processing a signal received at a ground-based receiver from a satellite-based transmitter subsystem of a satellite-based laser communications system in accordance with an exemplary embodiment of the present invention.

FIG. 7 illustrates a method of processing a signal received at a ground-based receiver from a satellite-based transmitter subsystem of a satellite-based laser communications system in accordance with an exemplary embodiment of the present invention, such as the embodiments of the ground-based receiver and the satellite-based laser communications systems described above. The ground-based receiver receives, at step 90, the signal that has been transmitted using a laser beam over a free-space optical link using light propagating in free space for wireless data communications, wherein the transmitted signal was polarization modulated onto the laser beam by altering the polarization state of the laser beam through adjustment of an optical phase between two linear polarization states, including a first linear polarization state and a second linear polarization state, using one or more high-speed phase modulators each including an electro-optical crystal aligned with its active axis at 45° to the linearly polarized input beam, and wherein the two linear polarization states of the polarization modulated laser beam were converted into two circularly polarized states for transmission using a quarter-wave ($\lambda/4$) optical wave plate. At step 91, an optical automatic gain control circuit performs automatic gain control on the received signal at an input to the ground-based receiver to account for signal fading and atmospheric conditions over the free-space optical link, the performance of optical automatic gain control including (1) estimating, using a channel state estimator, a state of communication channel parameters that may have degraded the received signal and outputting a control signal including estimated communication channel parameters to an optical amplifier; and (2) adjusting and amplifying, using the optical amplifier, the received signal based, at least in part, on the control signal output to output an automatic gain controlled signal that has the two circularly polarized states. At step 92, the automatic gain controlled signal is converted from the two circularly polarized states into an optical beam having two linear polarization states using a quarter-wave ($\lambda/4$) optical wave plate. At step 93, a polarizing beam splitter splits the optical beam into a first linearly polarized beam corresponding to the first linear polarization state and a second linearly polarized beam corresponding to the second linear polarization state. At step 94, a first detector detects the first linearly polarized beam using a first detector and a second detector detects the second linearly polarized beam using a second detector. In embodiments, the detection of the first linear polarization state and the second polarization state of the two optical beams includes detecting a first area on an imaging sensor focal plane using the first detector and detecting a second area on the imaging sensor focal plane using the second detector.

At step 95, image processing circuitry or a computer-implemented image processing module is used to generate a difference in the output of the two detectors to develop an output signal that includes the signal as encoded at the satellite-based transmitter. At step 96, a decoder decodes the output signal to obtain the transmitted data. At step 97, the decoded data is output. The method at least partially compensates for fading effects that occur during satellite transmissions to enable improvement in data throughput.

In embodiments, the method further includes performing error correction on the output signal where the transmitted signal was error correction encoded. Also, in embodiments, the method includes performing deinterleaving on the output signal when the transmitted signal was interleaved.

While particular embodiments of the present invention have been shown and described in detail, it would be obvious to those skilled in the art that various modifications and improvements thereon may be made without departing from the spirit and scope of the invention. It is therefore intended to cover in the appended claims all such modifications and improvements that are within the scope of this invention.

What is claimed is:

1. A ground-based receiver for receiving a signal transmitted by a satellite-based transmitter subsystem of a satellite-based laser communications system for communication between a satellite and the ground-based receiver using a laser beam over a free-space optical link that uses light propagating in free space for wireless data communications, wherein the received signal has been transmitted as a circularly polarized signal, wherein the ground-based receiver comprises:

(a) an optical automatic gain control circuit that processes the received signal that was transmitted by the satellite-based transmitter subsystem using the laser beam to account for signal fading and atmospheric conditions over the free-space optical link, wherein the optical automatic gain control circuit comprises:

(1) a channel state estimator that receives a fraction of the received signal, estimates a state of communication channel parameters that may have degraded the received signal, and outputs a control signal comprising estimated communication channel parameters; and (2) an optical amplifier to receive the control signal that is output by the channel state estimator and to adjust and amplify the received signal based, at least in part, on the control signal to output an automatic gain controlled signal that has two circularly polarized states;

(b) a quarter-wave ($\lambda/4$) optical wave plate to convert the automatic gain controlled signal from two circularly polarized states into an optical beam having two linear polarization states, including a first linear polarization state and a second linear polarization state;

(c) a polarizing beam splitter to split the optical beam into a first linearly polarized beam corresponding to the first linear polarization state and a second linearly polarized beam corresponding to the second linear polarization state;

(d) two detectors, including a first detector to detect the first linearly polarized beam and a second detector to detect the second linearly polarized beam;

(e) image processing circuitry or a computer-implemented image processing module comprising an algorithm to generate a difference in the output of the two detectors to develop an output signal that comprises the signal as encoded at the satellite-based transmitter subsystem;
(f) a decoder to decode the output signal to obtain the transmitted data; and
(g) an output module to output the transmitted data,
wherein the optical automatic gain control circuit at least partially compensates for fading effects that occur during satellite transmissions to enable improvement in data throughput.

2. The ground-based receiver of claim 1, wherein the decoder at the ground-based receiver is configured to perform error correction on the output signal when the received signal was error correction encoded at the satellite-based transmitter subsystem.

3. The ground-based receiver of claim 1, wherein the decoder at the ground-based receiver comprises a deinterleaver to deinterleave the encoded output signal when the received signal was interleaved at the satellite-based transmitter subsystem.

4. The ground-based receiver of claim 1, wherein the decoder at the ground-based receiver comprises a demultiplexer to obtain the multiple channels of data from the output signal when the multiple channels of data were multiplexed at the satellite-based transmitter subsystem.

5. The ground-based receiver of claim 1, wherein the optical amplifier comprises one or more optical fiber amplifiers.

6. The ground-based receiver of claim 1, wherein the first detector is configured to detect a first area on an imaging sensor focal plane and the second detector is configured to detect a second area on the imaging sensor focal plane.

7. The ground-based receiver of claim 1, wherein the ground-based receiver is configured to be used in conjunction with an on-off keying signaling system.

8. The ground-based receiver of claim 1, wherein the ground-based receiver is configured to be used in conjunction with a differential phase shift keying (DPSK) system.

9. The ground-based receiver of claim 1, wherein the received signal has been transmitted by the satellite-based transmitter subsystem to the ground-based receiver at a data rate at least as high as 10 Gbps.

10. A satellite-based laser communications system for communication between a satellite and a ground-based receiver, the satellite-based laser communications system comprising:
(1) a satellite-based transmitter subsystem to transmit a signal to the ground-based receiver over a free-space optical link, wherein the free space optical link uses light propagating in free space to wirelessly transmit data for telecommunications or computer networking, the satellite-based transmitter subsystem comprising:
(a) an input module for receiving data to be transmitted to the ground-based receiver,
(b) an encoder to encode the data to be transmitted;
(c) a processor configured to generate a transmission signal comprising the encoded data;
(d) a laser light source to generate a linearly polarized laser beam;
(e) at least one polarization modulator that further encodes the encoded data in the transmission signal onto the laser beam by polarization modulation of the laser beam through adjustment of an optical phase into two linear polarization states using one or more high-speed phase modulators each comprising an electro-optical crystal aligned with its active axis at 45° to the linearly polarized input beam;
(f) at least one transmitter for transmitting the polarization modulated laser beam, wherein the amount of energy in each of the two linear polarization states is dependent on the applied voltage; and
(g) a quarter-wave ($\lambda/4$) optical wave plate to convert the two linear polarization states of the polarization modulated laser beam into two circularly polarized states in which to transmit the laser beam via the free-space optical link such that the ground-based receiver need not be aligned in rotation with respect to the transmitter; and
(2) the ground-based receiver for receiving the signal transmitted by the satellite-based transmitter subsystem as a circularly polarized signal, the ground-based receiver comprising:
(a) an optical automatic gain control circuit that processes the received signal, to account for signal fading and atmospheric conditions over the free-space optical link, wherein the optical automatic gain control circuit comprises:
  i. a channel state estimator that receives a fraction of the received signal, estimates a state of communication channel parameters that may have degraded the received signal, and outputs a control signal comprising estimated communication channel parameters; and
  ii. an optical amplifier to receive the control signal that is output from the channel state estimator and to adjust and amplify the received signal based, at least in part, on the control signal to output an automatic gain controlled signal that has the two circularly polarized states;
(b) a quarter-wave ($\lambda/4$) optical wave plate to convert the automatic gain controlled signal from the two circularly polarized states into an optical beam having the two linear polarization states, including a first linear polarization state and a second linear polarization state;
(c) a polarizing beam splitter to split the optical beam into a first linearly polarized beam corresponding to the first linear polarization state and a second linearly polarized beam corresponding to the second linear polarization state;
(d) two detectors, including a first detector to detect the first linearly polarized beam and a second detector to detect the second linearly polarized beam;
(e) image processing circuitry or a computer-implemented image processing module comprising an algorithm to generate the difference in the output of the two detectors to develop an output signal that comprises the signal as encoded at the satellite-based transmitter subsystem;
(f) a decoder to decode the output signal to obtain the transmitted data; and
(g) an output module to output the transmitted data,
wherein the optical automatic gain control circuit at least partially compensates for fading effects that occur during satellite transmissions to enable improvement in data throughput.

11. The satellite-based laser communications system of claim 10, wherein the at least one transmitter comprises at least two transmitters, wherein each of the at least two transmitters transmits a portion of the polarization modulated laser beam to transmit the laser beam to the ground-based receiver.

12. The satellite-based laser communications system of claim 10, wherein the at least one transmitter comprises at least two transmitters that use a time division diversity scheme to account for possible different arrival times of different channels at the ground-based receiver.

13. The satellite-based laser communications system of claim 10, wherein the polarization modulation boosts signal strength and is not overcome by atmospheric interference and wherein the automatic gain control increases data throughput and eliminates the effects of fading that occur during satellite transmissions.

14. The satellite-based laser communications system of claim 10, wherein the encoder comprises an error correction encoder to encode the data to be transmitted with error correction codes.

15. The satellite-based laser communications system of claim 10, wherein the encoder comprises an interleaver to interleave the encoded data.

16. The satellite-based laser communications system of claim 10, wherein the encoder encodes the data to be transmitted into an analog or digital format using a relative intensity between the two linear polarization states.

17. A method of processing a signal received at a ground-based receiver from a satellite-based transmitter subsystem of a satellite-based laser communications system wherein the received signal has been transmitted as a circularly polarized signal, the method comprising:
(a) receiving, by the ground-based receiver, the signal that has been transmitted using a laser beam over a free-space optical link using light propagating in free space for wireless data communications,
wherein the transmitted signal was polarization modulated onto the laser beam by altering the polarization state of the laser beam through adjustment of an optical phase between two linear polarization states, including a first linear polarization state and a second linear polarization state, using one or more high-speed phase modulators each comprising an electro-optical crystal aligned with its active axis at 45° to the linearly polarized input beam, and
wherein the two linear polarization states of the polarization modulated laser beam were converted into two circularly polarized states for transmission using a quarter-wave ($\lambda/4$) optical wave plate;
(b) performing, by an optical automatic gain control circuit, automatic gain control on the received signal at an input to the ground-based receiver to account for signal fading and atmospheric conditions over the free-space optical link, the performance of optical automatic gain control comprising:
(1) estimating, using a channel state estimator, a state of communication channel parameters that may have degraded the received signal and outputting a control signal comprising estimated communication channel parameters to an optical amplifier; and
(2) adjusting and amplifying, using the optical amplifier, the received signal based, at least in part, on the control signal output to output an automatic gain controlled signal that has the two circularly polarized states;
(c) converting the automatic gain controlled signal from the two circularly polarized states into an optical beam having two linear polarization states using a quarter-wave ($a/4$) optical wave plate;
(d) splitting, with a polarizing beam splitter, the optical beam into a first linearly polarized beam corresponding to the first linear polarization state and a second linearly polarized beam corresponding to the second linear polarization state;
(e) detecting the first linearly polarized beam using a first detector and detecting the second linearly polarized beam using a second detector,
(f) generating, using image processing circuitry or a computer-implemented image processing module, a difference in the output of the two detectors to develop an output signal that comprises the signal as encoded at the satellite-based transmitter subsystem;
(g) decoding, using a decoder, the output signal to obtain the transmitted data; and
(h) outputting the decoded data;
wherein the method at least partially compensates for fading effects that occur during satellite transmissions to enable improvement in data throughput.

18. The method of claim 17, wherein the transmitted signal was error correction encoded, and wherein the method further comprises performing error correction on the output signal.

19. The method of claim 17, wherein the transmitted signal was interleaved, and wherein the method further comprises performing deinterleaving on the output signal.

20. The method of claim 17, wherein the detection of the first linear polarization state and the second polarization state of the two optical beams comprises detecting a first area on an imaging sensor focal plane using the first detector and detecting a second area on the imaging sensor focal plane using the second detector.

* * * * *